United States Patent
Snyder (10) Patent No.: US 11,184,357 B2
(45) Date of Patent: Nov. 23, 2021

(54) AUTHORIZING A COMPUTING DEVICE ACROSS SERVICES

(71) Applicant: BCE Inc., Verdun (CA)

(72) Inventor: Chris Snyder, Toronto (CA)

(73) Assignee: BCE INC., Verdun (CA)

(*) Notice: Subject to any disclaimer, the term of this patent is extended or adjusted under 35 U.S.C. 154(b) by 0 days.

(21) Appl. No.: 14/585,998

(22) Filed: Dec. 30, 2014

(65) Prior Publication Data

US 2015/0188923 A1 Jul. 2, 2015

Related U.S. Application Data

(60) Provisional application No. 61/922,394, filed on Dec. 31, 2013.

(51) Int. Cl.

| | |
|---|---|
| H04L 29/06 | (2006.01) |
| H04N 21/643 | (2011.01) |
| H04N 21/258 | (2011.01) |
| H04N 21/254 | (2011.01) |
| H04N 21/426 | (2011.01) |
| H04N 21/4627 | (2011.01) |
| H04N 21/41 | (2011.01) |
| H04L 12/14 | (2006.01) |
| H04L 29/08 | (2006.01) |
| H04L 29/12 | (2006.01) |

(52) U.S. Cl.
CPC .......... *H04L 63/10* (2013.01); *H04L 12/1457* (2013.01); *H04L 63/102* (2013.01); *H04N 21/2541* (2013.01); *H04N 21/25816* (2013.01); *H04N 21/4126* (2013.01); *H04N 21/42684* (2013.01); *H04N 21/4627* (2013.01); *H04N 21/64322* (2013.01); *H04L 12/1407* (2013.01); *H04L 12/1432* (2013.01); *H04L 61/35* (2013.01); *H04L 67/02* (2013.01)

(58) Field of Classification Search
CPC ............ H04N 21/254; H04N 21/2541; H04N 21/2543; H04N 21/25808; H04N 21/25816; H04N 21/25875; H04N 21/42684; H04N 21/4508; H04N 21/64; H04N 21/64322; H04N 21/4126; H04N 21/4627; H04L 63/10; H04L 63/102; H04L 12/1407; H04L 12/1432; H04L 12/1457; H04L 61/35; H04L 67/02
USPC ...................................... 725/25, 86, 109, 27
See application file for complete search history.

(56) References Cited

U.S. PATENT DOCUMENTS

| | | | |
|---|---|---|---|
| 8,027,296 B2 | 9/2011 | Hu et al. | |
| 8,898,249 B1* | 11/2014 | Bertz | ............... H04L 61/1511 709/217 |
| 9,100,206 B1* | 8/2015 | Barth | ............... H04L 12/2801 |
| 2002/0126701 A1 | 9/2002 | Requena | |

(Continued)

OTHER PUBLICATIONS

Official Action from Canadian Patent Application No. 2,876,708 dated May 23, 2017.

(Continued)

*Primary Examiner* — Jeremy S Duffield (57) ABSTRACT

Services may be accessed across a network. In order to provide access to the services, a user or more particularly a user's device may be authorized to access the requested service based on an IP address associated with the service request. A subscriber identifier is determined based on the IP address of the request and used to authorize the requested service.

13 Claims, 7 Drawing Sheets

(56) References Cited

U.S. PATENT DOCUMENTS

| | | | |
|---|---|---|---|
| 2006/0051055 A1* | 3/2006 | Ohkawa | H04N 21/25875 386/326 |
| 2007/0022469 A1* | 1/2007 | Cooper | H04K 1/00 726/3 |
| 2010/0023722 A1* | 1/2010 | Tabbara | H04L 43/00 711/170 |
| 2010/0034364 A1* | 2/2010 | Kilfoyle | H04L 12/2872 379/93.01 |
| 2011/0060845 A1* | 3/2011 | Jungck | H04L 67/2819 709/245 |
| 2011/0107436 A1* | 5/2011 | Cholas | H04N 21/2541 726/29 |
| 2011/0158406 A1* | 6/2011 | Marcia | G06F 21/10 725/118 |
| 2011/0191811 A1* | 8/2011 | Rouse | H04N 21/47202 725/93 |
| 2012/0011567 A1* | 1/2012 | Cronk | H04N 21/25875 726/4 |
| 2012/0254961 A1* | 10/2012 | Kim | H04L 12/66 726/7 |
| 2013/0086237 A1 | 4/2013 | Cutler et al. | |
| 2014/0082169 A1* | 3/2014 | Shinde | H04N 21/25883 709/223 |
| 2014/0282750 A1* | 9/2014 | Civiletto | H04N 21/4334 725/74 |
| 2014/0310416 A1* | 10/2014 | Durbha | H04N 21/25816 709/225 |
| 2015/0019746 A1* | 1/2015 | Shatzkamer | H04L 65/1069 709/228 |
| 2015/0043430 A1* | 2/2015 | Martin | H04L 61/157 370/328 |
| 2015/0089594 A1* | 3/2015 | Subramanian | H04W 8/205 726/4 |
| 2015/0106517 A1* | 4/2015 | Saunders | H04L 63/0428 709/225 |

OTHER PUBLICATIONS

Official Action from Canadian Patent Application No. 2,876,708 dated Jan. 9, 2017.
Official Action from Canadian Patent Application No. 2,876,708 dated Jan. 22, 2019.
Official Action from Canadian Patent Application No. 2,876,708 dated Dec. 9, 2019.
Official Action from Canadian Patent Application No. 2,876,708 dated Jul. 2, 2020.

* cited by examiner

AUTHORIZING A COMPUTING DEVICE ACROSS SERVICES

TECHNICAL FIELD

The current disclosure relates to authorizing a computing device for accessing a service, and in particular to authorizing a computing device accessing the service over a network connection.

BACKGROUND

Media content, such as television shows, movies and sporting events can be viewed on a number of different devices. The content consumption devices may include, for example, television sets, smartphones, tablets as well as browsers on computers. A user may subscribe to one or more services that provide access to specific content across one or more of the content consumption devices. For example, a TV provider, such as a cable or satellite provider can provide access to different TV channels according to a subscription package. Depending upon the user's subscription, they may be authorized to view the content on one or more different types of the content consumption devices.

Media content may be accessed using various content consumption devices; however, subscription information may need to be submitted to the service for authorization. Entering account information, such as usernames and passwords can be inconvenient. It would be desirable to provide an additional, alternative and/or improved technique for authorizing access to a service for a computing device.

BRIEF DESCRIPTION OF THE DRAWINGS

Embodiments are described herein with references to the appended drawings, in which.

DETAILED DESCRIPTION

In accordance with the current disclosure, there is provided a method for authorizing a computing device for accessing a network service comprising receiving a service request over an internet protocol (IP) network from the computing device; determining a subscriber ID associated with an IP address of the received service request; determining authorization of the subscriber ID for the requested service; and providing access to the requested service based on the determined authorization.

In an embodiment of the method, determining a subscriber ID associated with the IP address comprises determining an account ID associated with the IP address; and determining the subscriber ID associated with the account ID.

In a further embodiment of the method, a policy and charging rules function (PCRF) device determines the account ID associated with the IP address.

In a further embodiment of the method, determining authorization of the subscriber ID for the requested service comprises determining a service account ID associated with the subscriber ID; and determining authorization of the service account ID for the requested service.

In a further embodiment of the method, the requested service and network access for the computing device are provided by a common entity.

In a further embodiment of the method, determining a subscriber ID associated with the IP address comprises receiving a registration request from a content consumption device associated with the IP address, the registration request comprising an identifier associated with the content consumption device; determining the subscriber ID based on the identifier associated with the content consumption device; storing the subscriber ID in association with the IP address; subsequent to storing the subscriber ID, receiving a subscriber ID request comprising the IP address; determining the subscriber ID stored in association with the IP address received in the subscriber ID request; and returning the subscriber ID.

In a further embodiment of the method, the requested service and network access for the computing device are provided by different entities.

In a further embodiment of the method, the content consumption device comprises a set-top box.

In a further embodiment of the method, the identifier associated with the content consumption device is the subscriber ID.

In a further embodiment of the method, the requested service comprises a mobile television (TV) service wherein determining authorization comprises receiving a list of channels the computing device is authorized to view.

In a further embodiment of the method, the list of channels is provided in a service code format.

In a further embodiment of the method, determining authorization further comprises requesting a login to a conditional access system to allow the computing device to access content on a set-top box.

In a further embodiment of the method, providing access to the requested service based on the determined authorization comprises providing the computing device authorization data required by the computing device to access the requested service.

In a further embodiment of the method, providing access to the requested service based on the determined authorization comprises providing the requested service to the computing device.

In a further embodiment of the method, the computing device is connected to an IP network through a residential gateway.

In accordance with the current disclosure, there is further provided a computing device for authorizing a computing device for accessing a network service comprising a network connection for coupling the computing device to a network; a memory unit for storing data and instructions; a processing unit for executing instructions stored in the memory unit, when executed by the processing unit, the instructions configuring the computing device to: receive a service request over an internet protocol (IP) network from the computing device; determine a subscriber ID associated with an IP address of the received service request; determine authorization of the subscriber ID for the requested service; and provide access to the requested service based on the determined authorization.

In an embodiment of the computing device, determining a subscriber ID associated with the IP address comprises determining an account ID associated with the IP address; and determining the subscriber ID associated with the account ID.

In a further embodiment of the computing device a policy and charging rules function (PCRF) device determines the account ID associated with the IP address.

In a further embodiment of the computing device determining authorization of the subscriber ID for the requested service comprises determining a service account ID associated with the subscriber ID; and determining authorization of the service account ID for the requested service.

In a further embodiment of the computing device the requested service and network access for the computing device are provided by a common entity.

In a further embodiment of the computing device determining a subscriber ID associated with the IP address comprises receiving a registration request from a content consumption device associated with the IP address, the registration request comprising an identifier associated with the content consumption device; determining the subscriber ID based on the identifier associated with the content consumption device; storing the subscriber ID in association with the IP address; subsequent to storing the subscriber ID, receiving a subscriber ID request comprising the IP address; determining the subscriber ID stored in association with the IP address received in the subscriber ID request; and returning the subscriber ID.

In a further embodiment of the computing device the requested service and network access for the computing device are provided by different entities.

In a further embodiment of the computing device the content consumption device comprises a set-top box.

In a further embodiment of the computing device the identifier associated with the content consumption device is the subscriber ID.

In a further embodiment of the computing device the requested service comprises a mobile television (TV) service wherein determining authorization comprises receiving a list of channels the computing device is authorized to view.

In a further embodiment of the computing device the list of channels is provided in a service code format.

In a further embodiment of the computing device the executed instructions further configure the computing device to translate the service coded format into a channel number and electronic programming guide (EPG) call-sign.

In a further embodiment of the computing device determining authorization further comprises requesting a login to a conditional access system to allow the computing device to access content on a set-top box.

In a further embodiment of the computing device providing access to the requested service based on the determined authorization comprises providing the computing device authorization data required by the computing device to access the requested service.

In a further embodiment of the computing device providing access to the requested service based on the determined authorization comprises providing the requested service to the computing device.

In a further embodiment of the computing device the computing device is connected to an IP network through a residential gateway.

In accordance with the current disclosure, there is further provided a non-transitory computer readable medium having stored therein instructions which when executed by a processor of a computing device configure the computing device to receive a service request over an internet protocol (IP) network from the computing device; determine a subscriber ID associated with an IP address of the received service request; determine authorization of the subscriber ID for the requested service; and provide access to the requested service based on the determined authorization.

In an embodiment of the non-transitory computer readable medium, determining a subscriber ID associated with the IP address comprises determining an account ID associated with the IP address; and determining the subscriber ID associated with the account ID.

In a further embodiment of the non-transitory computer readable medium, a policy and charging rules function (PCRF) device determines the account ID associated with the IP address.

In a further embodiment of the non-transitory computer readable medium, determining authorization of the subscriber ID for the requested service comprises determining a service account ID associated with the subscriber ID; and determining authorization of the service account ID for the requested service.

In a further embodiment of the non-transitory computer readable medium, the requested service and network access for the computing device are provided by a common entity.

In a further embodiment of the non-transitory computer readable medium, determining a subscriber ID associated with the IP address comprises receiving a registration request from a content consumption device associated with the IP address, the registration request comprising an identifier associated with the content consumption device; determining the subscriber ID based on the identifier associated with the content consumption device; storing the subscriber ID in association with the IP address; subsequent to storing the subscriber ID, receiving a subscriber ID request comprising the IP address; determining the subscriber ID stored in association with the IP address received in the subscriber ID request; and returning the subscriber ID.

In a further embodiment of the non-transitory computer readable medium, the requested service and network access for the computing device are provided by different entities.

In a further embodiment of the non-transitory computer readable medium, the content consumption device comprises a set-top box.

In a further embodiment of the non-transitory computer readable medium, the identifier associated with the content consumption device is the subscriber ID.

In a further embodiment of the non-transitory computer readable medium, the requested service comprises a mobile television (TV) service wherein determining authorization comprises receiving a list of channels the computing device is authorized to view.

In a further embodiment of the non-transitory computer readable medium, the list of channels is provided in a service code format.

In a further embodiment of the non-transitory computer readable medium, the instructions when executed further configure the computing device to translate the service coded format into a channel number and electronic programming guide (EPG) call-sign.

In a further embodiment of the non-transitory computer readable medium, determining authorization further comprises requesting a login to a conditional access system to allow the computing device to access content on a set-top box.

In a further embodiment of the non-transitory computer readable medium, the instructions when executed further configure the computing device to receive a conditional access token in response to the requested login.

In a further embodiment of the non-transitory computer readable medium, providing access to the requested service based on the determined authorization comprises providing the computing device authorization data required by the computing device to access the requested service.

In a further embodiment of the non-transitory computer readable medium, providing access to the requested service based on the determined authorization comprises providing the requested service to the computing device.

In a further embodiment of the non-transitory computer readable medium, the computing device is connected to an IP network through a residential gateway.

Content may be provided to a subscriber through various communication channels. For example, a user may be able to receive media content, such as television shows, movies, sporting events, music etc. from a satellite provider, a cable provider, an IPTV (Internet Protocol Television) provider, a cellular network provider, or other individual content or service provider. Each content provider may have a respective distribution channel for providing the media content to a subscriber. A single content provider may provide content to subscribers over one or more channels. For example, a company may provide satellite or cable television service, cellular network service, and internet service. A single user may have a subscription for receiving content over each of the different channels. However, each different content distribution channel may be separate and provide its content from respective content stores, even if the content is the same. That is, multiple versions of the same content, such as a television show, may be stored in multiple different locations, and possibly under different names or identifiers, for distribution by the different distribution channels. Further, billing and account information across different services, even when provided by a single content provider, or entity, may also be provided by separate systems.

Depending upon the distribution channel, and possibly the communication network, different content may be available to a subscriber. For example, a user may be a subscriber to IPTV services as well as mobile TV services. The IPTV service may allow the subscriber to watch subscribed-to TV channels while in their home. The mobile TV service may provide different content, which may or may not overlap with the IPTV content, to the subscriber's mobile device over the cellular network or WiFi® networks. A subscriber may be able to access content on multiple devices, from multiple services they are authorized to use across multiple distribution channels. As described further herein, it is possible to authorize a user, or more particularly a user's device, for accessing a service such as watching subscribed to TV channels while in their home based on network information of the user's device used to access the service.

Figure 1:
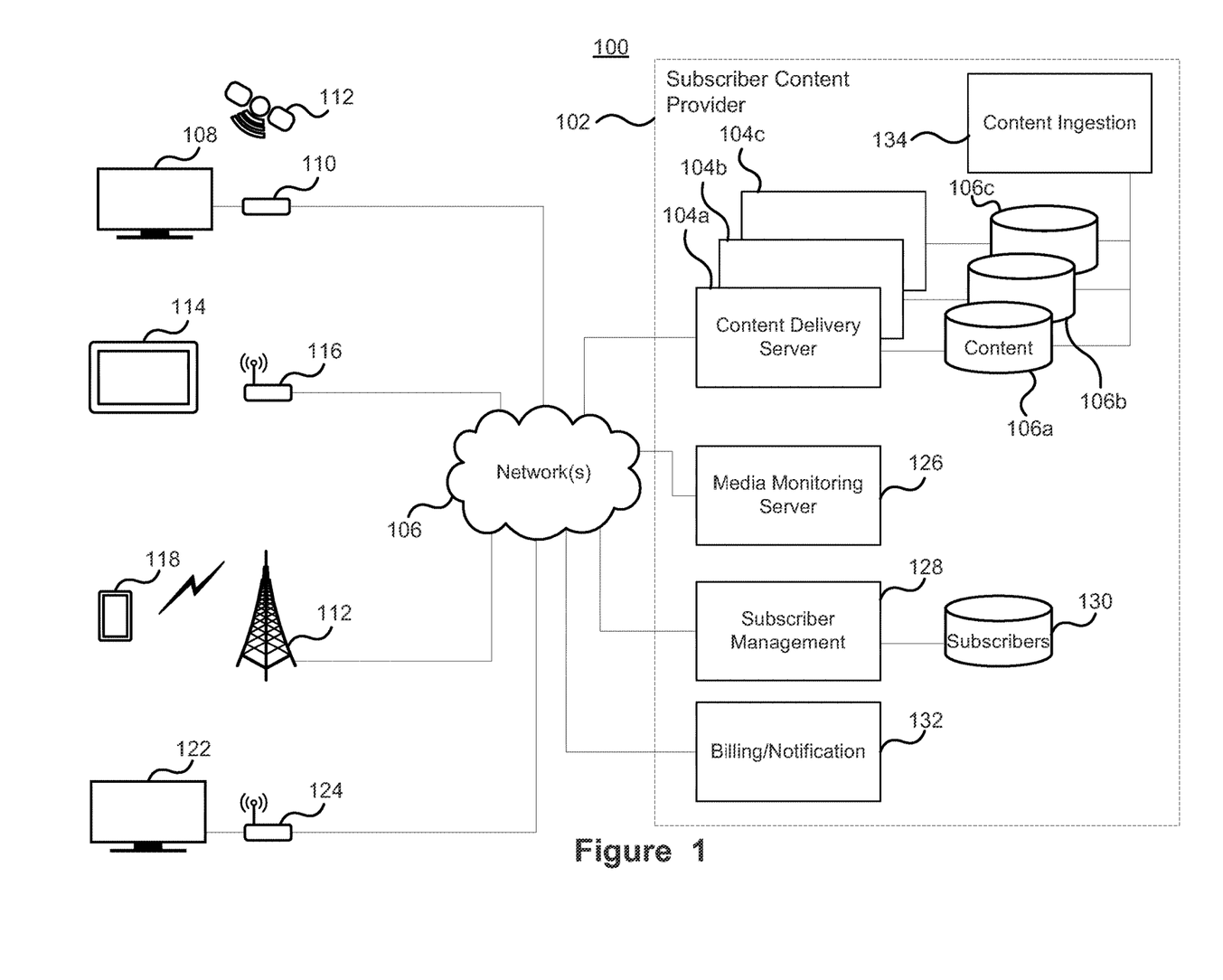
FIG. 1 depicts a content consumption system.

FIG. 1 depicts a content consumption system. The system 100 depicts a subscriber content provider system 102 that can provide media content to subscribers. The content provider system 102 may include a plurality of different content distribution channels, depicted as content delivery servers 104a, 104b, 104c (referred to collectively as content delivery servers 104) and corresponding content data stores 106a, 106b, 106c. As an example, content delivery server 104a and content store 106a may provide streaming IPTV services to subscribers, content delivery server 104b and content store 106 may provide mobile TV services to subscribers and content delivery server 104c and content store 106c may provide satellite TV services to subscribers. Each of the content delivery servers may distribute content across the respective network, which may include the internet, cellular networks, satellite communication networks, telephone networks, cable networks, or other networks.

The media content may be distributed over respective networks 108 from the content delivery servers 104 to one or more content consumption devices of a user. The content consumption devices may include, for example a set top box (STB) 110 that receives the media content from a head end system over a satellite 112 network. The STB 110 may be connected to a television 114. Additionally or alternatively, the functionality of the STB 110 may be incorporated into the television itself. Additionally, media content may be streamed to content consumption devices such as a tablet 118, smartphone or other portable device over a public or private WiFi network provided by an access point 116. The media content may also be provided to a smartphone 122, tablet or similar portable device, over a cellular communication network 120. Media content may also be provided to a IPTV STB or IPTV-capable television 126 from an in-home network, provided by a wired and/or wireless WiFi access point 124. Although various content consumption devices are described, it will be appreciated that these devices are only intended as examples and the media content may be provided to a content consumption device in other ways.

The subscriber content provider system 102 can provide media content from different distribution systems, which may be separate from each other. In order to provide an improved user experience in accessing content or other services across multiple distribution systems an authorization technique may be used that can authorize access to a service, such as accessing media content on a computing device, without requiring a user to enter username and password information. The computing device may be authorized based on an IP address used by the computing device to access the service. The IP address may be used to determine a subscriber ID or other identifier associated with the subscriber, which in turn may be used to authorize access to the service.

A media monitoring server 128 may be provided that monitors the media being consumed by a user. The media monitoring server 128 can monitor the content being consumed on a device and can control, or aid in the control of, the delivery of content to the user. The media monitoring server 128 may interact with a subscriber management system 130. The subscriber management system 130 may store subscriber information in a subscriber data store 132. The subscriber information may include, for example, a unique subscriber identifier, account information for each of the content delivery systems 104 the subscriber has an account for, billing information, etc.

The media monitoring server 128 may interact with a billing notification system 134 that uses the content consumption information in order to provide metering and billing based on the content consumed, as well as possibly the connection type used in consuming the content. The media monitoring server may interact with other network service and devices and may provide real-time access to network information, such as assigned network address and control network appliance to provide network service in accordance with one or more rules, such as rules specifying a quality of service (QoS) requirement.

As described above, media content can be provided to a subscriber over different communication channels and different distribution systems. The media content may be provided by a content provider. The content provider can provide the media content and metadata associated with the media content. Each of the content delivery systems may have specific requirements with regard to the encoding of the media asset and the format of the meta data. The subscriber content provider system 102 may include a content ingestion system 136 for receiving the media content and encoding the media asset for distribution across the different distribution systems. The content ingestion system 136 may also format the received metadata in accordance with the format requirements of the different distribution systems.

A user may access content using various devices including portable electronic devices such as tablets or smartphones. Depending upon the subscription of the user, and where the user is accessing the content from, that is from home or from outside the home, certain content and/or features may be available to the user. In order to access content, the user may be required to sign into an account, for example by providing a username and password in order to determine if the user is authorized to access the desired content. As described further below, when the user is accessing content on a portable electronic device from a home environment it may not be necessary for the user to sign in using the username and password. Instead, access to the content may be authorized based on their IP address since they are accessing the content from the home network.

Figure 2:
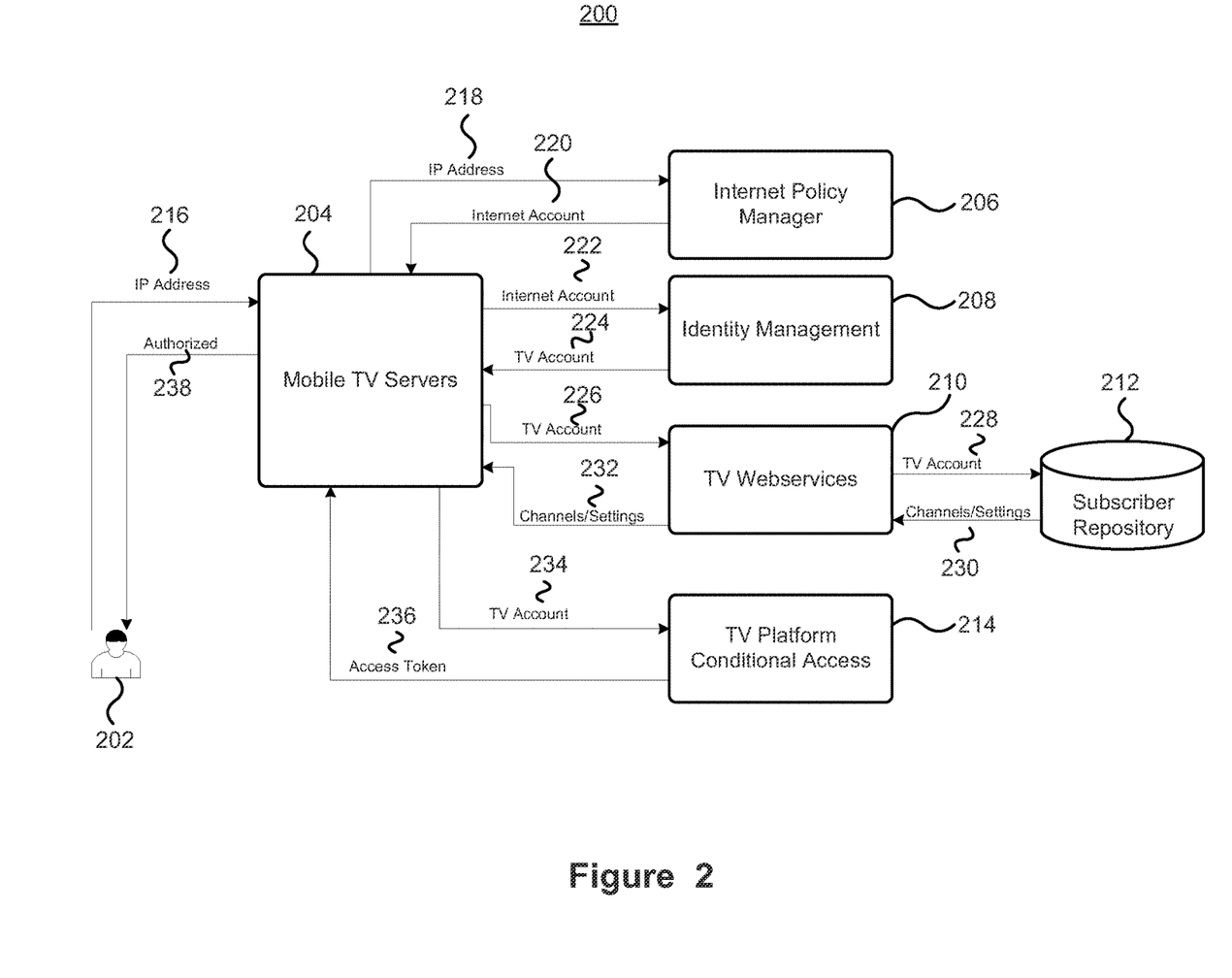
FIG. 2 depicts a system for authorizing access to content based on the network connection.

FIG. 2 depicts a system for authorizing access to content based on the network connection. FIG. 2 assumes that the user's internet and TV services are provided by the same entity, or entities that share user information with each other. The system 200 includes a mobile TV server 204, which may provide an interface for accessing TV content from a computing device such as a smartphone or tablet device. The mobile TV server 204 may receive requests for content from devices, and attempts to authorize the access to the content from the requesting device. An internet policy manager 206 may provide network related information about a request. For example, the internet policy manager may maintain, or provide access to, information about which IP address is currently assigned to a particular internet account. An identity manager 208 may provide account information for subscribers of different services. For example, the identity management information may link accounts of a single subscriber across multiple services, such as internet service, TV service and mobile TV service. A TV webservices component 210 may provide functionality for accessing a subscriber repository 212 that provides information about a particular TV subscription, such as the channels subscribed to and other preferences or settings. A TV platform conditional access component 214 may provide conditional access tokens to a user's device for interacting with conditional access systems, such as a set-top box.

As depicted, when a user 202 is accessing content from a mobile device over their home network, a request for desired content is sent from the mobile device to the mobile TV servers 216. The request includes the users IP address provided by the internet service provider. The request is received at the mobile TV server and the IP address is sent 218 to the internet policy manager 206. The internet policy manager uses the IP address to determine an internet account currently associated with the IP address. Once the internet account associated with the IP address is received it is returned 220 to the mobile TV server 204. The internet account is provided 222 to an identity management component 208 that uses the Internet account to determine a subscriber ID from which a TV account associated with the subscriber can be determined. Once determined, the TV account is returned 224 to the mobile TV server 204. The TV account is passed to the TV webservices component 210, which uses the TV account information 228 to retrieve channels/settings from a subscriber repository 212. The channels and settings, such as parental control settings, associated with the TV account are returned 230 to the TV webservices component 210, and subsequently returned 232 to the mobile TV server. The TV account may be provided 234 to a TV platform conditional access 214, which determines whether or not the user is authorized to access the requested content or service. If the user is authorized to view the content or access the service, an access token 236 may be returned to the mobile TV server 204. The mobile TV servers may then determine if the content should be viewed, or service accessed, for example based on the additional parental control settings, and if the content can be viewed, authorization is returned 238 to the user. If conditional access is provided, a token may be provided to the user's device for authorizing the access to the content or service, such as interacting with a set-top box. Accordingly, when the user is accessing content from their home network, it is not necessary to sign into their account using a user name and password. Instead the account information is retrieved and verified based on the IP address used to access the content.

The above described system assumes that the internet service provider and the TV provider are the same entity, or are entities that share information in order to allow a TV account to be determined from an IP address. If however, the ISP and TV providers are different entities, it may not be possible to authorize access to content as described above with reference to FIG. 2, since the TV provider may not have access to account information associated with the IP address. It may be possible to still authorize the access to content even when different entities provide the internet service than the TV service.

Figure 3:
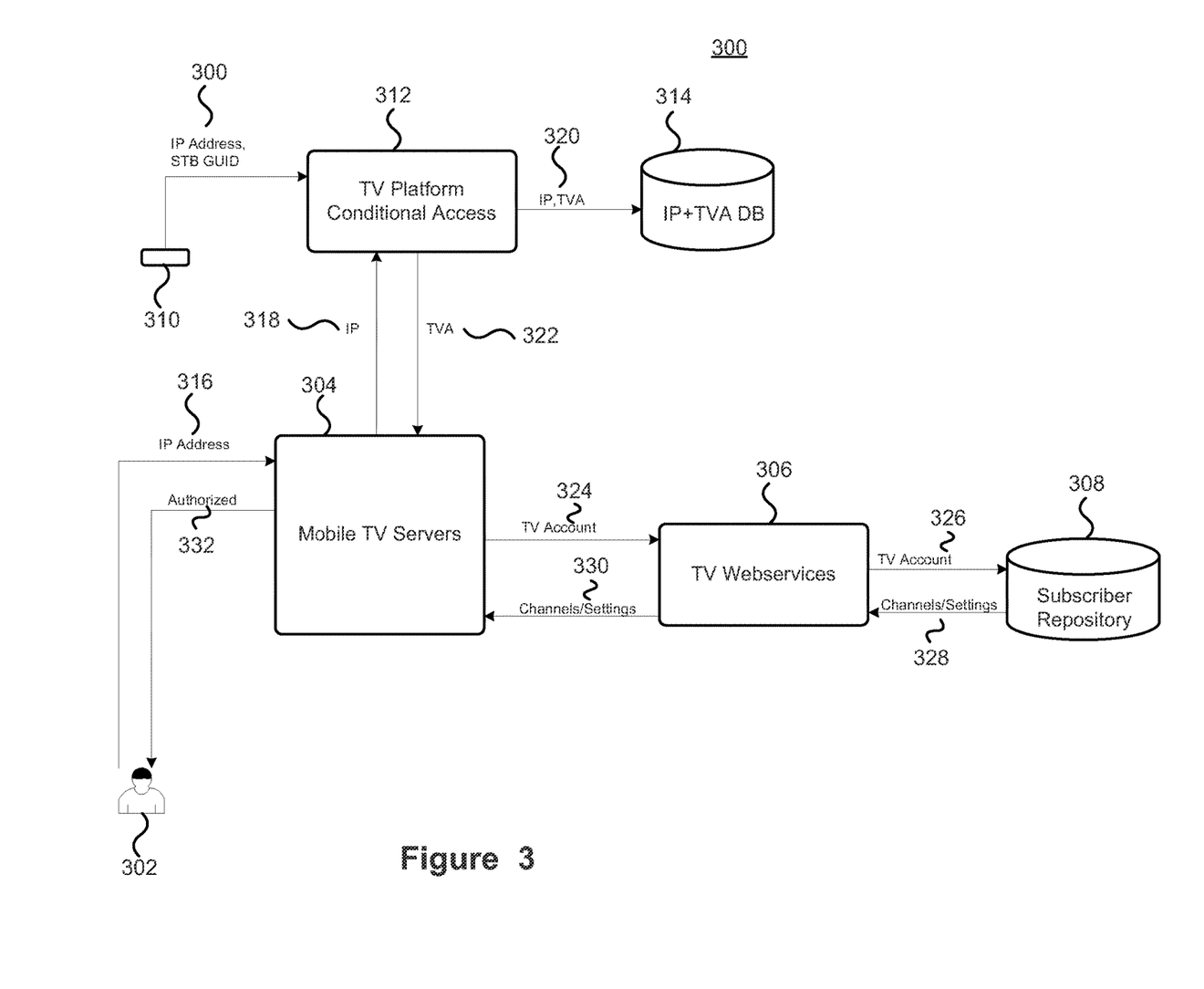
FIG. 3 depicts a further system for authorizing access to content based on the network connection.

FIG. 3 depicts a further system for authorizing access to content based on the network connection. The system 300 includes a mobile TV server 304, similar to the mobile TV server 204. The system 300 also includes TV webservices 306 and subscriber repository 308. The system 300 also includes a set top box (STB) 310 in the user's home that is connected to the internet. The system 300 also includes a TV platform conditional access component that stores TV account and associated IP addresses in an IP/TVA repository 314.

In order to determine an TV account associated with an IP address that may then be used to authorize TV access from other devices sharing the same IP address, the STB 310 may periodically send registration messages 316 to the TV platform conditional access component 312, which includes the IP address of the home network as well as the unique identifier of the STB, or the TV account information. The registration message 316 is received at the TV platform conditional access component 312, which uses the ID of the STB to determine an associated TV account. The TV account and associated IP address are provided 318 to the IP/TVA repository 314.

When a user 302 requests content access from their mobile device, a request, including IP address is sent 320 to the mobile TV servers 304. The IP address is provided to the TV platform conditional access component 312, which uses the repository 314 to determine a TV account associated with the IP address. The determined TV account is returned 324 to the mobile TV servers 304. The mobile TV servers 304 provide the TV account to the TV web services 306, which provides the TV account information 328 to the subscriber repository 308 in order to retrieve the channels and settings of the account, which are returned 330 to the TV web services 306 and then returned 332 to the mobile TV servers. The mobile TV servers determine if the user is authorized to access the content, and if they are authorized, the authorization is returned 334 to the user 302.

As described above, it is possible to authorize a user to access content based on the network used to access the content. The system may authorize the access if the user uses the same provider for TV and Internet service. The system may also authorize the access if the user has different subscribers for TV and Internet service.

Although described above as authorizing access to TV content from a computing device, it is possible to authorize a computer device for accessing a service instead of specifically accessing TV content. The service being accessed may be provided by the same entity that provides internet service for the computing device, or may be a different entity.

FIGS. 2 and 3 have been described as a mobile TV service that receives a request for accessing the mobile TV service and providing, based on the authorization determined using their IP address, access to the TV services. It is further contemplated that the IP authorization functionality described could be provided by an ISP of the user, or other entity capable of tracking assigned IP addresses and account information in real-time or near real-time, as an authorization service to other providers. For example, third party broadcaster could utilize the returned account information associated with an IP address in order to determine if a user is authorized for the determined service.

Figure 4:
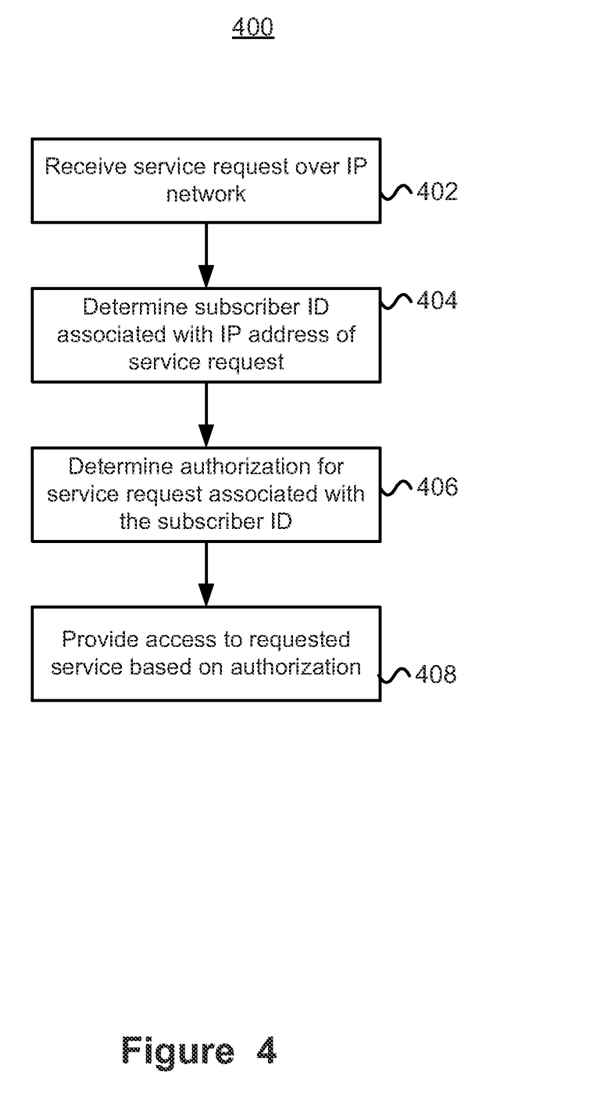
FIG. 4 depicts a method for authorizing a computer device to access a network service.

FIG. 4 depicts a method for authorizing a computer device to access a network service. The method 400 begins with receiving a service request over an IP network (402). The service request is assumed to be received from a computing device within a home network environment. The home network environment may provide Internet access to computing devices within the environment through a residential gateway. The residential gateway may provide network address translation (NAT) for computing devices in the home network environment. As is well understood, NAT allows multiple computing devices to share a single public IP address assigned by an internet service provider (ISP). The ISP may assign the IP address to the residential gateway either statically or dynamically. When IP addresses are assigned dynamically, the IP assignment may be periodically updated, for example daily, weekly, or on some other schedule, or based on the occurrence of an event such as a disconnection. In order to provide service to subscribers, ISPs track various information of users. For example, the ISP may track the IP address currently assigned to subscribers. Further, the ISP may track usage information in order to provide billing or other functionality. Regardless of other functionality provided, an ISP is able to determine a subscriber currently associated with a particular IP address. The information may be obtained in real-time, or near real-time, by querying a network appliance responsible for assigning the IP addresses to subscriber devices. Alternatively, the subscriber:IP association may be provided from the network appliance responsible for assigning the IP addresses to another network system that provides an interface for querying the information. For example policy and charging rules function (PCRF) services may be provided in order to allow querying of the subscriber information.

Once the request is received, a subscriber identifier (ID) associated with the service request (404) is determined. The subscriber ID may be determined in various ways. For example, if the requested service is provided by the same entity providing the internet service, or by an entity that has access to the internet service provider's subscriber information, the subscriber ID may be determined by querying the PCRF services, or service with similar functionality, with the IP address associated with the service request. The PCRF service may return a subscriber ID, or another ID, such as an internet account ID, that in turn can be used to determine the subscriber ID. Alternatively, if the requested service is not provided by the same entity providing internet service, and so does not have access to the ISP's subscriber information, a service may be queried that maintains a list of IP addresses and associated subscriber ID, or other account information that can be used to determine a subscriber ID. The association between an IP address and subscriber information may be provided by a network connected computing device within the user's home network. The network connected computing device may be for example a set-top box that is connected to the internet through the home residential gateway. The set-top box is associated with information that can be used to identify the subscriber. For example, a subscriber's account may be associated with a unique identifier of the set-top box, or the subscriber information may be provisioned on the set-top box. The set-top box may periodically contact the server maintaining the list of IP addresses and subscriber information. The periodic communication may provide the subscriber information and the current IP address of the user's home network. Additionally or alternatively, rather than using the set-top box, a computer device within the user's home network may be provided with subscriber information and may periodically transmit the subscriber information to the server that maintains the list of IPs and subscriber information.

Once the subscriber ID associated with the IP address of the service request is determined, the method determines authorization for the service being requested using the subscriber ID (406). Determining the authorization may depend on the service being provided. Generally the requested service may provide authorization services for determining if the service should be provided to the subscriber. The authorization service may receive a subscriber ID, or account ID, and determine if the subscriber is authorized to access the service. The subscriber ID may be used to retrieve an account ID of the subscriber for the service, and the access rights associated with the account ID. Once the authorization for the subscriber ID is determined the access to the service may be provided in accordance with the determined authorization (408).

Figure 5:
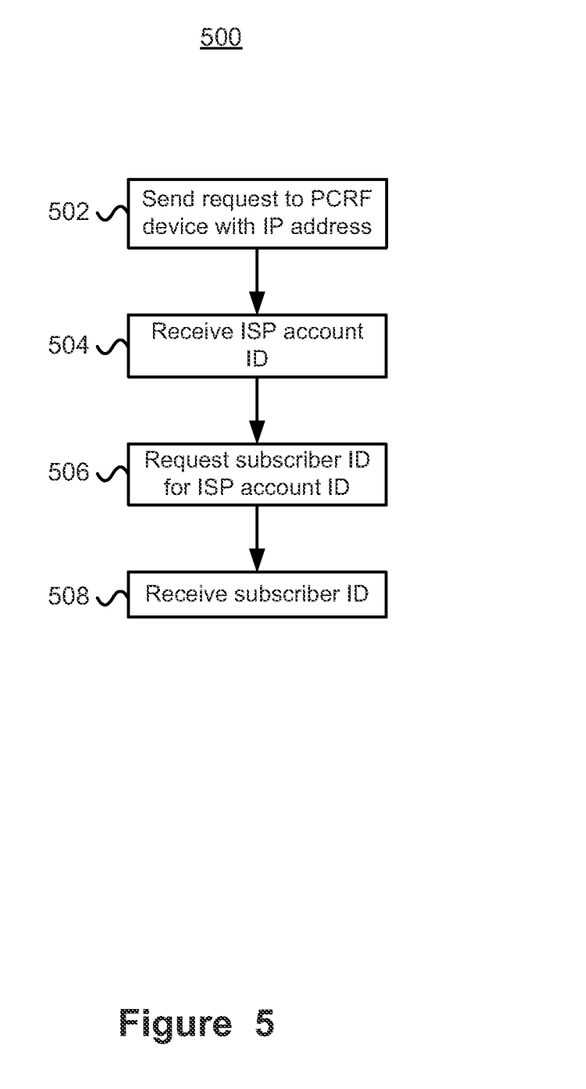
FIG. 5 depicts a method for determining a subscriber ID from an IP address.

FIG. 5 depicts a method for determining a subscriber ID from an IP address. The method 500 may be used to perform step 404 described above with reference to FIG. 4. The method 500 sends a request to a PCRF device (502). The PCRF device may be a network device that maintains network related information, including IP assignments, and provides a querryable interface to allow the network information to be queried in real-time or near real-time. In response to the PCRF query with the IP address, the PCRF device returns an account associated with the IP address. The account returned may not be the subscriber ID, but may be an ISP account of the subscriber. Although described as being provided by a PCRF device, other devices or functionality capable of providing an account associated with an IP address in real-time or near real-time may be used. The returned account may be sent to a subscriber management system in a request (506) that maintains subscriber information, including different accounts associated with the same subscriber. The subscriber ID is received (508) and may be used in authorizing devices associated with the IP address.

Figure 6:
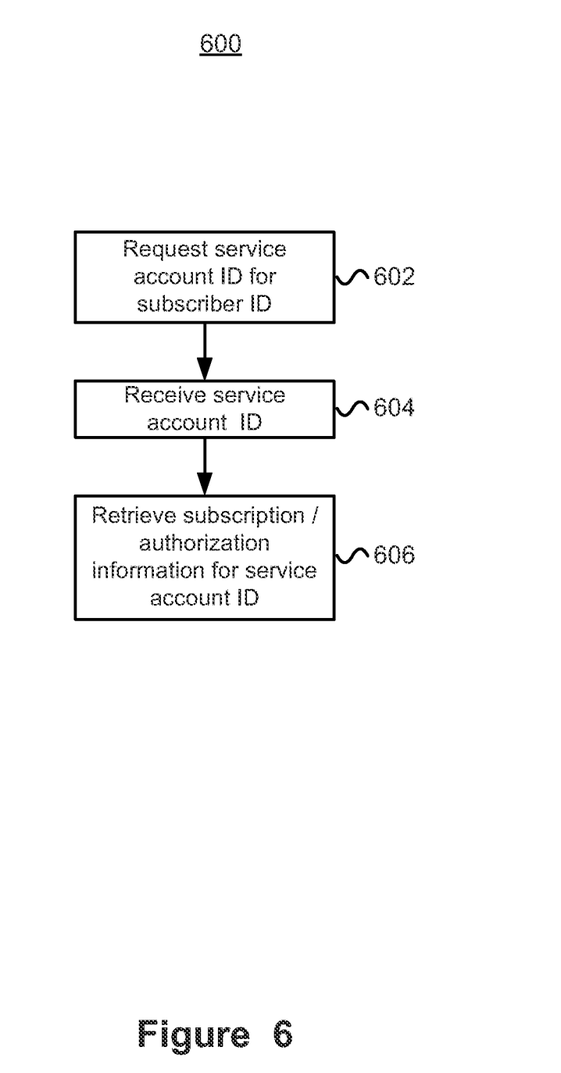
FIG. 6 depicts a method of authorizing a service request based on a subscriber ID.

FIG. 6 depicts a method of authorizing a service request based on a subscriber ID. The method 600 may be used in performing step 406 described above with reference to FIG. 4. The method 600 begins with requesting a service account ID associated with the subscriber ID. The service account ID is an account ID of the subscriber associated with the service and may be used to authorize the subscriber to access the service. The service account ID is received (604) and used to retrieve subscription and/or authorization information for the service account ID (606). The subscription and/or authorization information may vary depending upon the service being accessed. For example, the authorization information may simply be an indication that the service account ID is authorized to access the service. Additionally or alternatively, the subscription and/or authorization information may provide more detailed information about the access to the service the subscriber is authorized for. As an example, if the service is a mobile TV service, the subscription and/or authorization information may provide an indication as to what channels the subscriber is authorized to access.

Figure 7:
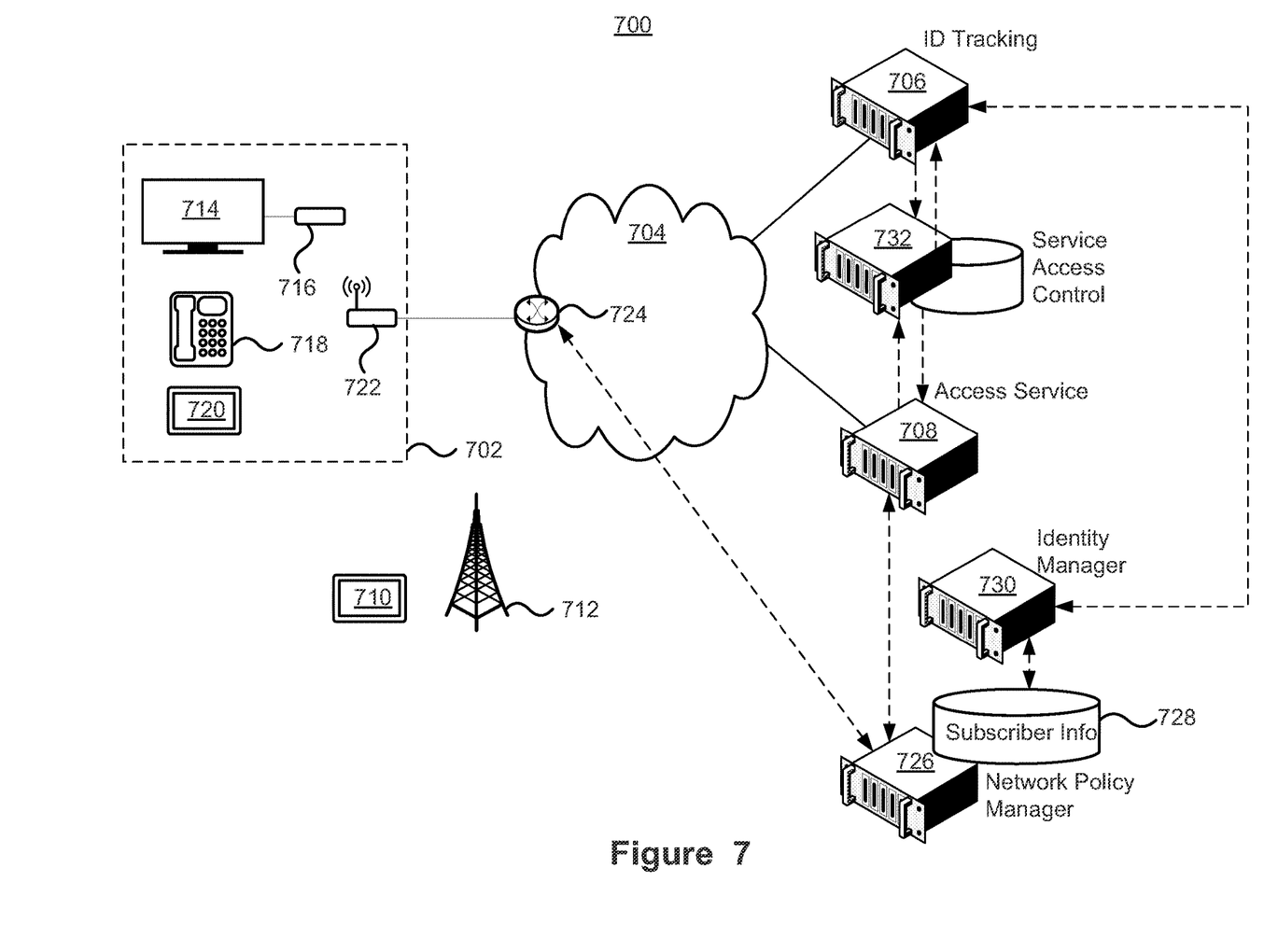
FIG. 7 depicts an environment in which a computing device may be authorized to access a service based on an IP address.

FIG. 7 depicts an environment in which a computing device may be authorized to access a service based on an IP address. The environment 700 comprises a number of computer devices that may be networked together. For example, computing devices within user's home network environment 702 may be communicatively coupled to one or more network services through a network 704. The network services may include, for example an ID tracking services 706 as well as an access service 708. The TV distribution service may provide access to TV content via a set-top box. The access service may be any type of network service, such as a mobile TV service that allows a subscriber to access TV content on a portable device. The available TV content may vary depending upon the location the user is accessing the service from. For example, a first set of channels may be accessible to the user when accessed using a computing device, such as tablet 710, connected over a cellular network 712, while a second set of channels may be accessible to the user when accessed using a computing device from within the home network environment 702 in which a TV subscription is available.

The user's home network environment 702 may include a number of computing devices and/or content consumption devices. For example, a television 714 may be connected to a set top box 716 that receives television content the user has subscribed to. The set top box 716 may include information for use in determining the content the user is subscribed to. The information may include, a unique identifier of the set-top box 716 that can be associated with the subscriber by a TV provider. The home network environment 702 may further include a voice over IP (VoIP) phone 718, which may be provided as a hardware phone or as a soft-phone executed on a computing device. The home networking environment 702 may further comprise one or more computing devices such as personal computers, laptops, smart phones, tablets 720 etc. The network devices in the user's home network environment may access the network 704 through a gateway 722. The gateway 722 provides a private network address to each of the devices within the network environment 702. The gateway device is assigned an IP address from the network service provider. The assigned IP address may be a publicly routable IP address. The gateway 722 may connect to an access network appliance, depicted as a router 724, that assigns the IP address. It will be appreciated that the network details with regard to assigning IP addresses and providing network access are not described in detail herein.

A user may access a service 708 over the network 704. It is assumed that the user must supply an account ID in order to determine if the user is authorized to access the service. Depending upon where the user accesses the service 708 from, the user may be required to supply the account ID, or the account ID may be determined automatically. For example, when a user accesses the service 708 from the tablet 710 over the cellular network, the user must supply the account ID; however, when accessing the service 708 from a tablet, or other computing device, from within the user's home network environment 702 the access service 708 may utilize the IP address in order to determine the account ID and authorize the user to access the service.

If the access service 708 is provided by the same entity that provides the internet access to the subscriber, than the access service 708 may query a network policy manager 726 in order to retrieve a network account ID associated with the IP address used to access the service 708. The network policy manager may communicate with the network appliances 724 in order to track the subscriber and associated IP information. The network policy manager 726 may store the account information in a subscriber information repository 728 which may be in communication with the network appliances 724 in order to track IP addresses assigned to a particular network account ID. Once the network account ID is retrieved, the access service 708 may retrieve an associated subscriber ID from an identity manager 730 that maintains subscriber and account information, which is depicted as being maintained in the subscriber information repository 728, although a different database, or data structure may be used. The identity manager 730 may store different account IDs with a subscriber's ID. For example, a single subscriber may be provided with a single subscriber ID and the identity manager 730 may associate different account IDs for each of the different services the subscriber is subscribed to, such as an account ID for internet service, an account ID for television, an account ID for cellular service, an account ID for VoIP service. The identity manager 730 may be provided with the internet account ID and returns either the subscriber ID, which may then be used to determine an account ID associated with the requested service, or may return the requested service account ID directly. Once the service account ID is received, the service may determine the authorization of the account ID for accessing the service. A service access control 732 may provide subscription or authorization information associated with the service account ID that provides an indication as to the allowable services for the subscriber.

As described above, the access service 708 may access a policy manager 726 in order to determine an account ID associated with an IP address. When the access service 708 is unable to obtain an account ID associated with an IP address from the policy manager, for example, when the service 708 is provided by a different entity than the internet service provider, an alternative technique for associating an account with the IP address may be necessary. An ID tracking service 706 may be provided that receives a message from a device within the user's home network environment 702. The message provides an indication of the subscriber ID. Since the message is received over the network 704, the message will include the public IP address of the user's home network environment 702. The indication of the subscriber ID may be the subscriber ID itself, or a unique identifier, such as a hardware identifier, that can be associated with the subscriber identifier. When the ID tracking service 706 receives a message, the subscriber ID may be determined and associated with the IP address. The subscriber ID and IP address may be provided to the identity manager 730 for storing and use by the access service when authorizing a device using an IP address.

The above has described various functionality provided by various systems. The functionality may be provided as a combination of hardware, firmware and software comprising instructions stored in a memory or other non-transitory computer readable medium, that are executed by a processor. When executed by a processor, or processors, the instructions configure the devices to provide at least some of the functionality described. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A method for authorizing a requesting computing device for accessing a network service comprising:
    registering a subscriber comprising:
       receiving a registration request, originating from a set-top box, the registration request received via a network of a first service provider providing internet service, the registration request comprising an IP address assigned by the first service provider and a unique identifier (UID) of the set-top box;
       determining an existing subscriber ID of the subscriber to a service provided by a second service provider different from the first service provider by using the UID of the set-top box received in the registration request to retrieve the subscriber ID of the subscriber having previously been assigned the set-top box with the UID by the second service provider;
       storing the determined subscriber ID in association with the IP address of the registration request in a data store;
    subsequent to registering the subscriber, receiving a network service request, originating from the requesting computing device, and having a requesting IP address that is the same IP address of the registration request;
    accessing the data store to determine the subscriber ID stored in the data store in association with the requesting IP address of the received service request;
    determining authorization of the subscriber ID for accessing the requested network service using the computing device; and
    providing the requested network service to the requesting computing device over the network based on the determined authorization,
    wherein the requested service comprises a mobile television (TV) service, and
    wherein determining authorization comprises:
       requesting a login to a conditional access system to allow the requesting computing device to access content on the set-top box; and
       receiving a list of channels the requesting computing device is authorized to view.

2. The method of claim 1, wherein determining the subscriber ID stored in the data store in association with the requesting IP address comprises:
    determining an account ID associated with the requesting IP address; and
    determining the subscriber ID associated with the account ID.

3. The method of claim 2, wherein a policy and charging rules function (PCRF) device determines the account ID associated with the requesting IP address.

4. The method of claim 2, wherein determining authorization of the subscriber ID for the requested service comprises:
    determining a service account ID associated with the subscriber ID; and
    determining authorization of the service account ID for the requested service.

5. The method of claim 1, wherein providing the requested network service to the requesting computing device over the network based on the determined authorization comprises:
    providing the requesting computing device authorization data required by the computing device to access the requested service.

6. The method of claim 1, wherein providing the requested network service to the requesting computing device over the network based on the determined authorization comprises:
    providing the requested service to the requesting computing device.

7. A computing server for authorizing a requesting computing device for accessing a network service comprising:
    a network connection for coupling the computing device to a network;
    a memory unit for storing data and instructions;
    a processing unit for executing instructions stored in the memory unit, when executed by the processing unit, the instructions configuring the computing device to:
       register a subscriber in association with an internet protocol (IP) address by:
          receiving a registration request, originating from a set-top box, the registration request received via a network of a first service provider providing internet service, the registration request comprising an IP address assigned by the first service provider and a unique identifier (UID) of the set-top box;
          determining an existing subscriber ID of the subscriber to a service provided by a second service provider different from the first service provider using the UID of the set-top box received in the registration request to retrieve the subscriber ID of the subscriber having previously been assigned the set-top box with the UID by the second service provider;
          storing the determined subscriber ID in association with the IP address of the registration request in a data store;
       subsequent to registering the subscriber, receive a network service request, originating from the requesting computing device, and having a requesting IP address that is the same IP address of the registration request;
       access the data store to determine the subscriber ID stored in the data store in association with the requesting IP address of the received service request;
       determine authorization of the subscriber ID for accessing the requested network service using the computing device; and provide the requested network service to the requesting computing device over the network based on the determined authorization,
wherein the requested service comprises a mobile television (TV) service, and
wherein determining authorization comprises:
  requesting a login to a conditional access system to allow the requesting computing device to access content on the set-top box; and
  receiving a list of channels the requesting computing device is authorized to view.

8. The computing server of claim 7, wherein determining the subscriber ID stored in the data store in association with the requesting IP address comprises:
  determining an account ID associated with the requesting IP address; and
  determining the subscriber ID associated with the account ID.

9. The computing server of claim 8, wherein a policy and charging rules function (PCRF) device determines the account ID associated with the requesting IP address.

10. The computing server of claim 8, wherein determining authorization of the subscriber ID for the requested service comprises:
  determining a service account ID associated with the subscriber ID; and
  determining authorization of the service account ID for the requested service.

11. The computing server of claim 7, wherein providing the requested network service to the requesting computing device over the network based on the determined authorization comprises:
  providing the requesting computing device authorization data required by the computing device to access the requested service.

12. The computing server of claim 7, wherein providing the requested network service to the requesting computing device over the network based on the determined authorization comprises:
  providing the requested service to the requesting computing device.

13. A non-transitory computer readable medium having stored therein instructions which when executed by a processor of a computing server configure the computing server to:
  register a subscriber in association with an internet protocol (IP) address by:
    receiving a registration request, originating from a set-top box, the registration request received via a network of a first service provider providing internet service, the registration request comprising an IP address assigned by the first service provider and a unique identifier (UID) of the set-top box;
    determining an existing subscriber ID of the subscriber to a service provided by a second service provider different from the first service provider using the UID of the set-top box received in the registration request to retrieve the subscriber ID of the subscriber having previously been assigned the set-top box with the UID by the second service provider;
    storing the determined subscriber ID in association with the IP address of the registration request in a data store;
  subsequent to registering the subscriber, receive a network service request, originating from a requesting computing device, and having a requesting IP address that is the same IP address of the registration request;
  access the data store to determine the subscriber ID stored in the data store in association with the requesting IP address of the received service request;
  determine authorization of the subscriber ID for accessing the requested network service using the computing device; and
  provide the requested network service to the requesting computing device over the network based on the determined authorization,
  wherein the requested service comprises a mobile television (TV) service, and
  wherein determining authorization comprises:
    requesting a login to a conditional access system to allow the requesting computing device to access content on the set-top box; and
    receiving a list of channels the requesting computing device is authorized to view.

* * * * *